United States Patent
Vugdelija (10) Patent No.: US 6,609,361 B2
(45) Date of Patent: Aug. 26, 2003

(54) PRIMARY FREQUENCY REGULATION METHOD IN COMBINED-CYCLE STEAM TURBINES

(75) Inventor: Jorge Vugdelija, Buenos Aires (AR)

(73) Assignee: Pecom Energia, S.A., Buenos Aires (AR)

( * ) Notice: Subject to any disclaimer, the term of this patent is extended or adjusted under 35 U.S.C. 154(b) by 0 days.

(21) Appl. No.: 09/998,013

(22) Filed: Nov. 30, 2001

(65) Prior Publication Data

US 2003/0010037 A1 Jan. 16, 2003

(30) Foreign Application Priority Data

Jul. 13, 2001 (AR) .................................... P 01 01 03353

(51) Int. Cl.$^7$ ............................. F02G 6/00; F02G 1/00; F02G 3/00
(52) U.S. Cl. ........................ 60/39.182; 60/772; 60/773
(58) Field of Search ............................. 60/39.182, 772, 60/773

(56) References Cited

U.S. PATENT DOCUMENTS

| | | | | |
|---|---|---|---|---|
| 3,913,329 A | * | 10/1975 | Priluck ........................ 60/660 |
| 3,995,440 A | * | 12/1976 | Wengen ....................... 62/48.2 |
| 4,245,162 A | * | 1/1981 | Ronnen et al. ............ 290/40 R |
| 4,393,649 A | * | 7/1983 | Cheng ........................... 60/775 |
| 4,471,446 A | * | 9/1984 | Podolsky et al. ........... 700/290 |
| 4,522,025 A | * | 6/1985 | Greune et al. ............. 60/39.15 |
| 4,577,280 A | * | 3/1986 | Putman ....................... 700/282 |
| 4,687,946 A | * | 8/1987 | Jones ........................ 290/40 R |
| 5,134,845 A | * | 8/1992 | Romano ................... 60/39.281 |
| 5,136,848 A | * | 8/1992 | Silvestri, Jr. ................. 60/646 |
| 5,191,764 A | * | 3/1993 | Silvestri, Jr. ................. 60/660 |
| 5,333,457 A | * | 8/1994 | Silvestri, Jr. ................. 60/646 |
| 5,555,719 A | * | 9/1996 | Rowen et al. ................ 60/773 |
| 5,634,772 A | * | 6/1997 | Kawaguchi ................... 417/22 |
| 2002/0011063 A1 | * | 1/2002 | Nagata et al. ............. 60/39.03 |
| 2002/0108366 A1 | * | 8/2002 | Saitoh et al. ............ 60/39.182 |
| 2002/0194832 A1 | * | 12/2002 | Smith ...................... 60/39.182 |

\* cited by examiner

*Primary Examiner*—Charles G. Freay
*Assistant Examiner*—William H. Rodriguez
(74) *Attorney, Agent, or Firm*—Howrey Simon Arnold & White, LLP (57) ABSTRACT

A method to provide Primary Frequency Regulation to a steam turbine in a combined cycle plant that comprises storing energy in the form of internal energy of the steam contained within the piping and domes of the heat recovery boilers, and then using said energy when the power grid requires a sudden increase in output power. With the present method, the losses in power generation of the steam turbine, when said turbine is operating in the Primary Frequency Regulation mode, are reduced to a minimum. When the gas turbines in a combined cycle plant operate in PFR mode, the steam turbine reduces its output power because the gas turbines must operate below their rated power. The present method converts said decrease in output power of the steam turbine in a Spinning Reserve useful for PFR in said turbine. That is to say that the present method converts said Spinning Reserve in a rapid reserve, available after just a few seconds; if necessary, response times of less than 10 seconds can be attained. The present method introduces several novel steps, which constitute its essence, said steps permitting the continuous, long term operation of the steam turbine in a combined cycle plant in PFR mode, thereby ensuring at any time the effectiveness of mains frequency regulation and also guaranteeing the stability of the power generation process in said combined cycle plant.

5 Claims, 5 Drawing Sheets

PRIMARY FREQUENCY REGULATION METHOD IN COMBINED-CYCLE STEAM TURBINES

This application claims the benefit of Argentine Patent Application No. P 01 01 03353, filed on Jul. 13, 2001.

FIELD OF THE INVENTION

The present invention relates to a method for providing Primary Frequency Regulation in the steam turbines of combined-cycle power generation plants, such plants comprising at least one gas turbine and at least one steam turbine.

PRIOR ART

Before the development of the present invention, most power generators associated with steam turbines forming part of combined cycle plants based on gas turbines were not capable of being provided with the type of control known in the art as Primary Frequency Regulation (PFR). PFR is a function required by the agencies in charge of dispatch in power networks of many countries and is considered to be one of the parameters characterizing the quality of power delivered to customers.

The problem to be solved in steam turbines of combined cycle power plants is basically that the steam turbine is unable to supply significant amounts of additional power (between 3 and 10% of its rated capacity) within a short period of time (response time on the order of a few seconds, e.g., from 10 to 30 seconds), to effectively compensate for any variation in the mains frequency caused by sudden changes in demand. "Response time" means the time it takes the turbine to reach the required final output level upon the occurrence of a step-type frequency deviation of a given magnitude.

Primary frequency regulation is not a major problem in steam turbines associated with conventional thermal cycles, that is, those where the steam used to drive the turbine is generated in a fired boiler. In these cases, the fuel-feeding loops into the boiler's burners are adjusted to meet the required transient response, and in most cases a satisfactory performance is obtained.

On the contrary, steam turbines in combined cycles with gas turbines pose a quite different problem. In these cycles, the steam needed to drive the steam turbines comes from heat recovery boilers, which generate steam out of the heat content in gas turbine exhaust gases. In these cases, the time constants associated with the energy transfer from the exhaust gases to the water-steam circuit in the heat recovery boiler are extremely high. Therefore, upon a variation in the energy content of the exhaust gases from the gas turbines, the corresponding variations in the water-steam circuit will make them reach their final state only after several minutes. Response times of this order of magnitude are not useful to attain PFR because, as stated above, response times of several seconds are necessary.

Unlike conventional cycle steam turbines, in combined cycle steam turbines it is not possible to adjust the amount of energy fed into the boilers at will. This is because the energy fed into the heat recovery boiler comes from the exhaust gases of the gas turbine, the properties of which change according to the power output of the gas turbine. Since the gas turbine must supply Primary Frequency Regulation service, its output cannot be taken to a condition different than that required to provide said PFR service.

Consequently, steam turbines in combined cycle facilities are usually excluded from the network's PFR, and this degrades the quality of power currently delivered by combined cycles.

Some combined cycle plants are equipped to perform an additional combustion step at some point in the gas piping connecting the gas turbine with the heat recovery boiler. This particular type of combined cycle can potentially perform a PFR function in the steam turbine by modulating fuel injection into the burners. This is a well known and valid way of providing PFR in steam turbines, which is derived from the operating procedure of steam turbines in conventional cycles, and has been widely disclosed in the related technical literature. However, the use of an additional combustion system in combined cycle plants originates in economic criteria unrelated to PFR, and only a small number of such plants make use of this system. On the other hand, due to unstable combustion as well as other technical considerations, it is not common to find combined cycle plants with additional combustion systems that provide PFR service in their steam turbines.

Sometimes combined cycle plants that are required to provide PFR service do so only with their gas turbines due to the difficulties encountered to comply with this requirement for steam turbines. Some of these plants provide "over-regulation" by means of their gas turbines combined, so as to make up for the deficiency of the steam turbine. However, none of these operational modes is efficient. To provide PFR with a gas turbine, it must be dispatched under its rated capacity. The reason why a turbine providing PFR must operate below its rated capacity, in normal frequency conditions, is that the turbine needs to have some extra capacity to deliver additional power when the frequency decreases. This extra capacity is called Spinning Reserve. The decrease in output in the gas turbines causes a reduction in the output of the associated steam turbine. However, such loss of power generated by the steam turbine is completely useless, because the combined cycle plant will generate less power and the managers of the system will not consider it as Spinning Reserve for PFR purposes.

Another aspect of the current state of the art is that in all combined cycle plants, irrespective of their origin, steam turbines operate normally in the "sliding pressure" mode. In this operational mode, the steam turbine control valves remain totally open once the starting procedure of the turbine is over. Thus, all of the steam that the heat recovery boilers are capable of producing enters into the steam turbine without exerting any modulation action on the steam turbine. It is generally accepted that any throttling of the steam turbine control valves would cause a dramatic loss in output power, as well as introduce instability in the process, because the steam turbine would not be using all of the steam generated in the heat recovery boiler. This idea has frequently led combined cycle plant manufacturers and operators to think that the provision of PFR by means of steam turbines in combined cycle plants is not practical.

SUMMARY OF THE INVENTION

To solve the above-described problems, the method of the present invention makes it possible to supply PFR service to the power network by means of steam turbines operating in combined cycle plants, regardless of whether these plants are equipped with additional combustion installations in their exhaust piping. Such purpose can be achieved efficiently both from the standpoint of network frequency control, and from the standpoint of plant operation. Thus, the method of the present invention increases the quality of power delivered by combined cycle power plants.

The basic operating principle of the invention consists in storing energy in the form of internal energy of the steam contained in the dome and in the piping of the heat recovery boiler, then using the stored energy when the power demand in the network increases sharply. According to the principles of Primary Frequency Regulation, the occurrence of such an increase is marked by a decrease in frequency below its rated value. To put this basic principle to work in an efficient way, several complex controls must be performed, all of which are covered by the present method.

A further object of the present invention is to reduce to a minimum any losses in the power generated by the steam turbine, when the turbine operates in the Primary Frequency Regulation mode. As explained above, when gas turbines in a combined cycle plant operate in PFR mode, the steam turbine must be operated below its rated capacity, since gas turbines must also be operated below their rated capacity. The method of the present invention converts the decrease in the power generated by the steam turbine into a Spinning Reserve useful to implement PFR in that turbine. Thus, the Spinning Reserve is converted into readily available back-up power, available in just a few seconds. Response times as low as 10 seconds or less can be achieved if necessary. By means of the present invention, it is no longer necessary to decrease the output power of the steam turbine to a greater extent to achieve a Spinning Reserve useful for PFR.

BRIEF DESCRIPTION OF THE DRAWINGS

Other objects and advantages of the invention will become apparent upon reading the following detailed description and upon reference to the drawings in which.

Operating Principle

In order to supply PFR in a steam turbine operating in a combined cycle plant by the method of the present invention, the related gas turbines must also be operated in PFR mode.

As explained above, when gas turbines provide PFR, a certain amount of power from the steam turbine is lost because the gas turbines must operate below their rated capacity. Under conventional prior art methods, the Spinning Reserve created in the steam turbine is not readily available by the network as required by the PFR. The method of the invention converts the Spinning Reserve into readily available back-up power within the short response times necessary for PFR. Therefore, it is no longer necessary to decrease the output power of the steam turbine to a greater extent to operate the steam turbine in PFR mode.

When gas turbines are operated in PFR mode, variations in the output power of gas turbines because of PFR will cause variations in the output power of steam turbines as well. This is because, upon a change in output power in gas turbines, the available energy in exhaust gases will also change, which will in turn provoke changes in the internal energy of steam. The latter will in turn modify the output power of the steam turbine in the same direction as those in the gas turbines.

Figure 1:
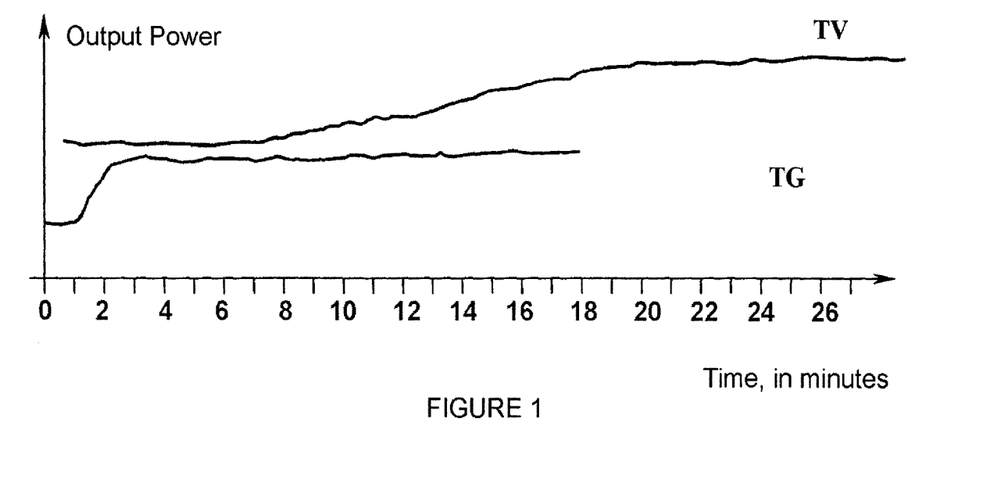
FIG. 1 is a representation of a rapid change in the output power of a gas turbine in a typical combined-cycle plant, and the resulting change in the output power of the steam turbine versus time.

FIG. 1 is a representation of a rapid change in the output power of a gas turbine in a typical combined-cycle plant, and the associated change in output power caused in the steam turbine, versus time. In a non-limiting example, a rapid increase of approximately 5 percent in output power of the gas turbine was assumed, based on the output power of the gas turbine before the change. A value of 5 percent was chosen because it is a typical Spinning Reserve value required by the authorities in charge of power dispatch. However, should other values be used in the example, the results obtained should be very similar. Curve TG in FIG. 1 shows the evolution of gas turbine output power versus time, while curve TV corresponds to the steam turbine. It can be seen that the time constant of the change in output power of the steam turbine for a given change in the output power in the gas turbine is very high. This example suggests a response time by the steam turbine of approximately 20 minutes. In other words, once an increase in output power of the gas turbine occurs, the output power in the steam turbine will reach its final value only after 20 minutes. This response time is not acceptable to achieve PFR in the system, since, as stated above, response times of just a few seconds are required.

However, if long term frequency deviations are considered, the gas turbines will readily reach their new load condition, and will remain in that condition as long as the frequency deviation persists. Once the response time characterizing the transfer of energy from gas turbine exhaust gases to steam has elapsed, the steam turbine will reach its new load condition, which will then have changed in the same direction as the gas turbine (as seen in the example of FIG. 1), thus complying with PFR requirements.

Therefore, long-term response of the steam turbine, or steady-state response, should be considered completely satisfactory. Short-time response, or transient response, which is most important for PFR, must be now enhanced.

It must also be considered that, when operating gas turbines associated with a steam turbine in PFR mode, the steam pressure in piping and boiler components will be lower than normal. This is because the gas turbines will be operating below their base output power. The decrease in steam pressure is extremely useful in the present method, as will be explained below.

To provide a better transient response, the method of the present invention is based on the innovative use of the stored energy principle. Energy is stored without decreasing the output power of the steam turbine to a greater degree than is necessary when gas turbines are operating in PFR mode.

Stored energy is used to readily supply additional power required by the PFR function, which used to be a shortcoming of combined cycle steam turbines in the prior art. In case a decrease in output power is required, said decrease can be readily achieved, according to a well-known practice, by throttling the turbine control valves as necessary.

To achieve the storage of energy, the steam turbine control valves should be throttled. However, valve throttling should not be indiscriminate. Valve throttling is necessary to implement the method; and within an acceptable control valve throttling range, removing the steam turbine from the "sliding pressure" mode will not cause significant energy losses, as was believed in the prior art. On the contrary, any such losses are negligible and thus very difficult to measure. It can be concluded that no losses in output power or in combined cycle efficiency occur.

By throttling the steam turbine control valves, steam pressure in piping and boiler components increases.

Consequently, care should be taken not to exceed the design pressure of installations such as piping and boiler components. However, this is not a major obstacle against the application of the present method, since the operation of the associated gas turbines in PFR mode, together with the decrease in output power in the steam turbine, both cause a decrease in steam pressure.

Therefore, upon throttling the steam turbine control valves, the equipment will operate at a steam pressure above the pressure corresponding to the same load condition but with the steam turbine in the "sliding pressure" mode. Nevertheless, the steam pressure will not exceed the design pressure corresponding to operation at rated output power.

The storage of energy derives from the fact that steam pressure in the facility is greater than the pressure corresponding to the same load condition in normal turbine operation.

The amount of stored energy is in general terms given by the total volume of steam contained in the facility at an increased pressure.

Figure 2:
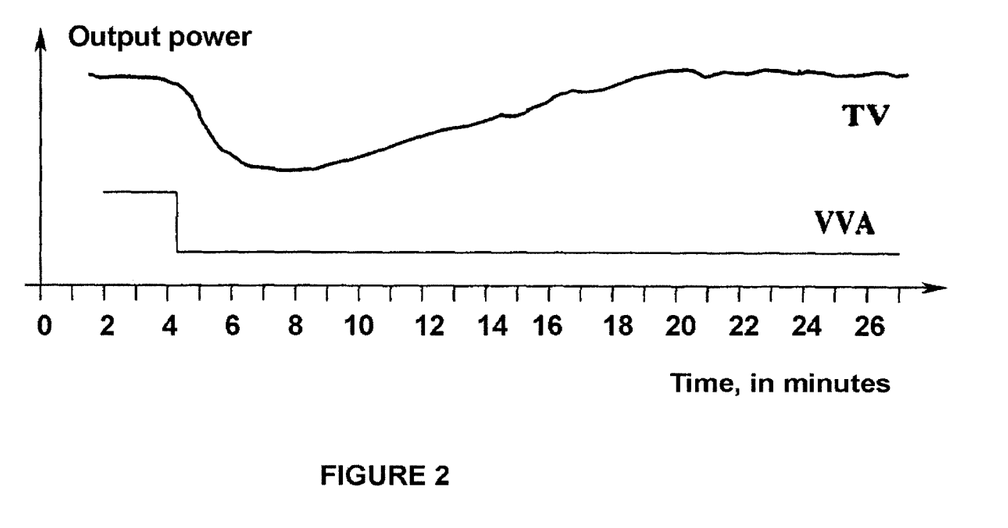
FIG. 2 depicts the effect of throttling the steam turbine control valves on steam turbine output power.

FIG. 2 illustrates the process undergone by the steam turbine output power when the turbine control valves are throttled.

FIG. 2 depicts the behavior of the steam turbine output power upon the throttling of the turbine control valves. Both variables are shown against time. The TV curve represents the variations of the steam turbine output power with time. The VVA curve represents the aperture of the steam turbine control valves with time. Initially, a sudden throttling is introduced, reducing the aperture of the control valves. The output power in the steam turbine initially decreases. With time, output power steadily recovers its original value. The reason for this is that the increased steam pressure upstream the control valves causes the inlet pressure to the turbine to be restored, even with the control valves throttled. The loss of head in the control valves causes no significant losses in efficiency or in output power, since differential steam pressure values required in control valves are comparatively low.

However, if a certain degree of throttling in the control valves is exceeded, the behavior of the system will no longer be the one depicted in FIG. 2. On the contrary, upon throttling the valves, the steam turbine output power will decrease, with no further recovery.

To determine the optimal steam turbine control valve throttling degree for every situation, two basic considerations should be made. The first consideration concerns the amount of Spinning Reserve useful for PFR that needs to be obtained from the steam turbine—that is, how much additional output power the machine should readily supply within a response time of a few seconds. This Spinning Reserve value is directly linked to the requirements of the local power grid to which the combined cycle plant is connected. The second basic consideration concerns the length of time during which such increment in the steam turbine output power should be sustained by the extra energy stored in the steam, until the additional energy coming from the gas turbines operating at a higher output power is available to the steam turbine. Once a permanent increase in the output power of the steam turbine is attained, in response to a decrease in frequency, such permanent increase in the output power can be sustained for as long as the frequency deviation persists.

In general terms, the first of the two above-mentioned basic considerations will require a greater degree of throttling of the steam turbine control valves, as compared to the throttling required by the second above-mentioned basic consideration. Therefore, the present method intends first to determine the degree of control valve throttling necessary to comply with the Spinning Reserve requirements for PFR, and later to check that such control valve throttling degree is enough to sustain over time the output power requirements derived from the PFR function. Should this not be the case, a greater throttling degree will be necessary.

Typically, the greater the requirement for instantaneous Spinning Reserve, the greater the degree of throttling of the control valve must be. When the aperture of the control valves is reduced, the pressure differential across the valve increases. On the other hand, there is a direct relationship between the pressure differential across the turbine control valves and the additional output power the turbine is capable of supplying readily. However, this relationship varies according to the construction characteristics of each plant.

In order to determine the relationship between the pressure differential across the turbine control valves and the amount of the Spinning Reserve useful for PFR, practical tests must be ran. To run these tests it is necessary in the first place to operate the gas turbines with the same amount of Spinning Reserve they would have in case the turbines were operated in the PFR mode, except that they will not be actually operated in such a mode, but to a constant output power. Starting with the turbine in the "Sliding pressure" mode (i.e., with the control valves fully open), a certain throttling degree will then be introduced in the control valves. After throttling the control valves, the process must be allowed to stabilize. A stable condition for the process will be reached when both the output power in the steam turbine and the steam pressure upstream the control valves reach values that remain constant over time. For this purpose, small oscillations near the constant values, considered normal in the operation of these plants, will not be taken into account. The new steam turbine output power value will match very closely the value of the output power of the turbine prior to the throttling of the control valves. Once the process is stable again, the amount of the pressure differential across the turbine control valves must be recorded. Afterwards, a sudden aperture of the throttled control valves will be effected. The test shall be repeated for several other throttling positions of the control valves, trying to attain an amount of Spinning Reserve useful for PFR, equal to the maximum value with which it is desired to operate the PFR of the steam turbine. The pairs of values for Steam Differential Pressure/obtained Spinning Reserve useful for PFR, will be used in the application of the present method, as disclosed in the section Description of the Method below.

In case the Spinning Reserve requirement is not very severe, typically only the control valves in the high pressure stage of the steam turbine shall be throttled. However, when the requirements of Spinning Reserve for PFR exceed a certain value, which has to be determined for each facility, it will become necessary to throttle the control valves at different pressure stages of the steam turbine. This requirement will become self-evident either when the maximum working steam pressure is reached in any of the components in the facility, or when, notwithstanding a significant loss in steam turbine output power induced by throttling the control valves in the high pressure stage of the turbine, the desired Spinning Reserve useful for PFR is not attained. In these cases the above mentioned test must be repeated by simultaneously throttling the control valves in different steam pressure stages in the turbine, and reopening them also at the same time. If, even under these conditions, the maximum working steam pressures are reached, but the desired amount of Spinning Reserve useful for PFR is not achieved, then the amount of Spinning Reserve useful for PFR of the steam turbine shall be limited to the maximum value attainable.

Regarding the loss of output power in the steam turbine, and the loss of efficiency of the combined cycle plant, if it was necessary to throttle the steam valves to a point where output power is being lost to comply with a certain amount of Spinning Reserve, a financial evaluation shall be performed for every particular case, by comparing the cost of the loss in output power with the extra revenue resulting from participating in the PFR function. The convenience of using the present method will result from such evaluation.

The present method is based on the above described tests used to sustain at any moment a differential pressure across the steam turbine control valves, in order to supply the amount of increased output power required by the PFR function.

Two principal operational modes are currently available for varying output power of a turbine-driven generator operating in the PFR mode, upon the occurrence of variations in the mains frequency. In both cases, the variations to be forced on the turbines as a function of variations in the mains frequency, depend upon a factor called Statism. The main difference between both modes relates to the way this factor is derived, and the way variations in the turbine are subsequently controlled.

The most traditional mode, deriving from the old turbine mechanical governor technology, defines Statism or "Droop" as a percent ratio between the mains frequency variation and the corresponding variation that must be imposed on the turbine control valves. In this mode, every change in the mains frequency causes corresponding changes in the position of actuators in the turbine control valves. The changes in the position of the actuators in the turbine control valves will undoubtedly cause corresponding changes in the output power. However, these latter changes are not precisely predictable, since there is not a univocal relationship between the aperture of the steam turbine control valves and the corresponding output power. The relationship between control valve position and steam turbine output power is affected by a large number of factors such as pressure and temperature of the steam, condition of the different turbine components, current mains frequency, and so on. Therefore, when operating with PFR under this mode, the actual contribution of these turbines to the control of the mains frequency cannot be predicted accurately. This is indeed not welcome by the authorities in charge of power dispatch.

In the second mode, introduced mainly with electronic turbine governors, Statism is used to derive the variation in the output power the turbine must supply for a given frequency variation. Afterwards, the PFR controller exerts a control action that finally alters the control valve position, so that the turbine will actually undergo the desired output power variations. This second mode of operation is much more efficient and predictable. Care must be taken here that the PFR controller have a reduced proportional action, while its action should be mainly integral, in order to avoid malfunctioning during sharp variations in the mains frequency.

In the method of the present invention, the inventors have decided to determine Statism and control according to the second mode, because of its better efficiency to control the mains frequency.

Another problem must be solved to allow combined cycle steam turbines to leave the "sliding pressure" control mode and control the output power, and thus meet PFR requirements. It is necessary to know exactly what output power the turbine must deliver in idling conditions, to avoid causing generation limitations. These limitations should be avoided, and the steam turbine shall not be forced to deliver an immoderate output power. Both situations would cause poor performance of the PFR function, and would also cause instability in the power generation process, like overpressures or sharp changes in system parameters. To avoid the above-mentioned problems, the method of the present invention incorporates a special control structure.

In order to introduce the output power variations needed for the PFR function, the method comprises modulating the turbine control valves. The response times that can be achieved when varying the steam turbine output power by reopening the control valves and liberating the stored energy are extremely low (less than 10 seconds). In general terms, these response times comply with the most stringent PFR requirements currently in practice. For example, the United Kingdom's Grid Code calls for response times of less than 10 seconds, while the Argentine code requires less than 30 seconds. The goal is to adopt a response time slightly below the time required by the code. This is made by adjusting the variables of a proportional plus integral controller, described in the present method, thus avoiding unnecessary sharp movements.

Figure 3:
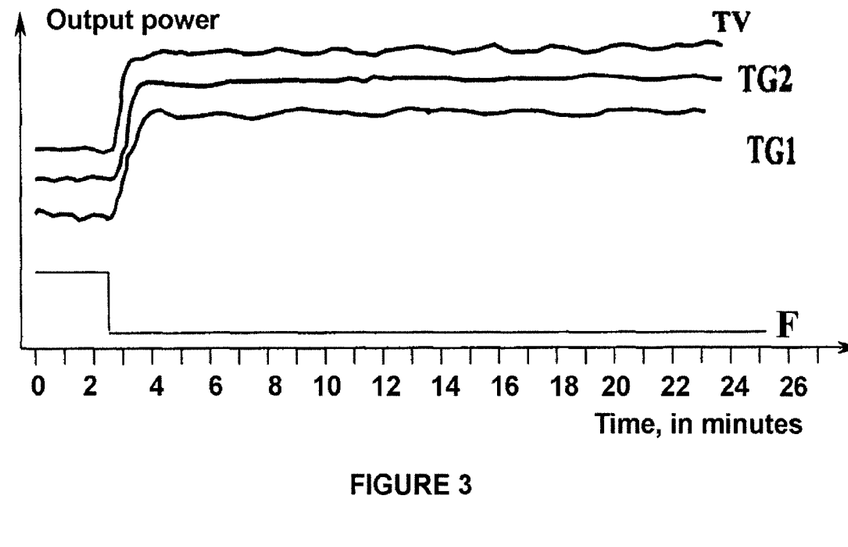
FIG. 3 depicts the response of a combined cycle composed of two gas turbines and one steam turbine operating under primary frequency response according to the method of the present invention.

FIG. 3 depicts the response of a combined cycle composed of two gas turbines and one steam turbine, operating under PFR according to the method of the present invention, upon a simulated long time reduction in the mains frequency. Curve F represents frequency versus time. An initial value of frequency equal to the rated frequency is assumed, which diminishes later on. Curves TG1 and TG2 represent respectively the time behavior of the output power of both gas turbines. Curve TV represents the time behavior of the steam turbine. The steam turbine output power reaches its final condition after response times similar to those of the gas turbines. On the other hand, the increase in output power is sustained during all of the recording time.

According to the present method, the gas turbines can operate in PFR mode, under the design parameters established by the manufacturers. It is not necessary to introduce changes in the design parameters. The only requirement is to select the appropriate Statisms both for the gas turbines and for the steam turbine.

DETAILED DESCRIPTION OF THE METHOD

Figure 4:
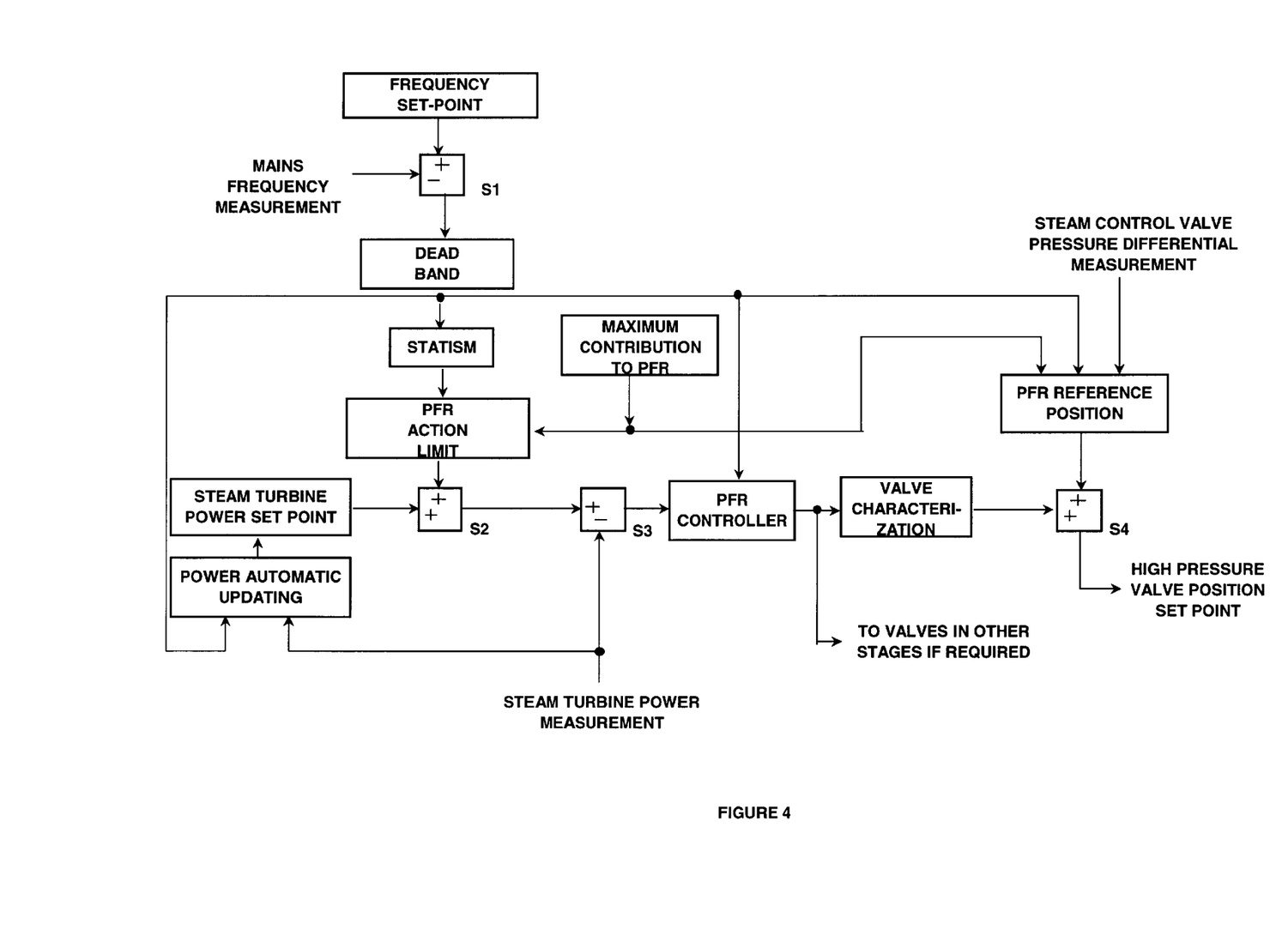
FIG. 4 illustrates a general block diagram of the method of the present invention.
Figure 5:
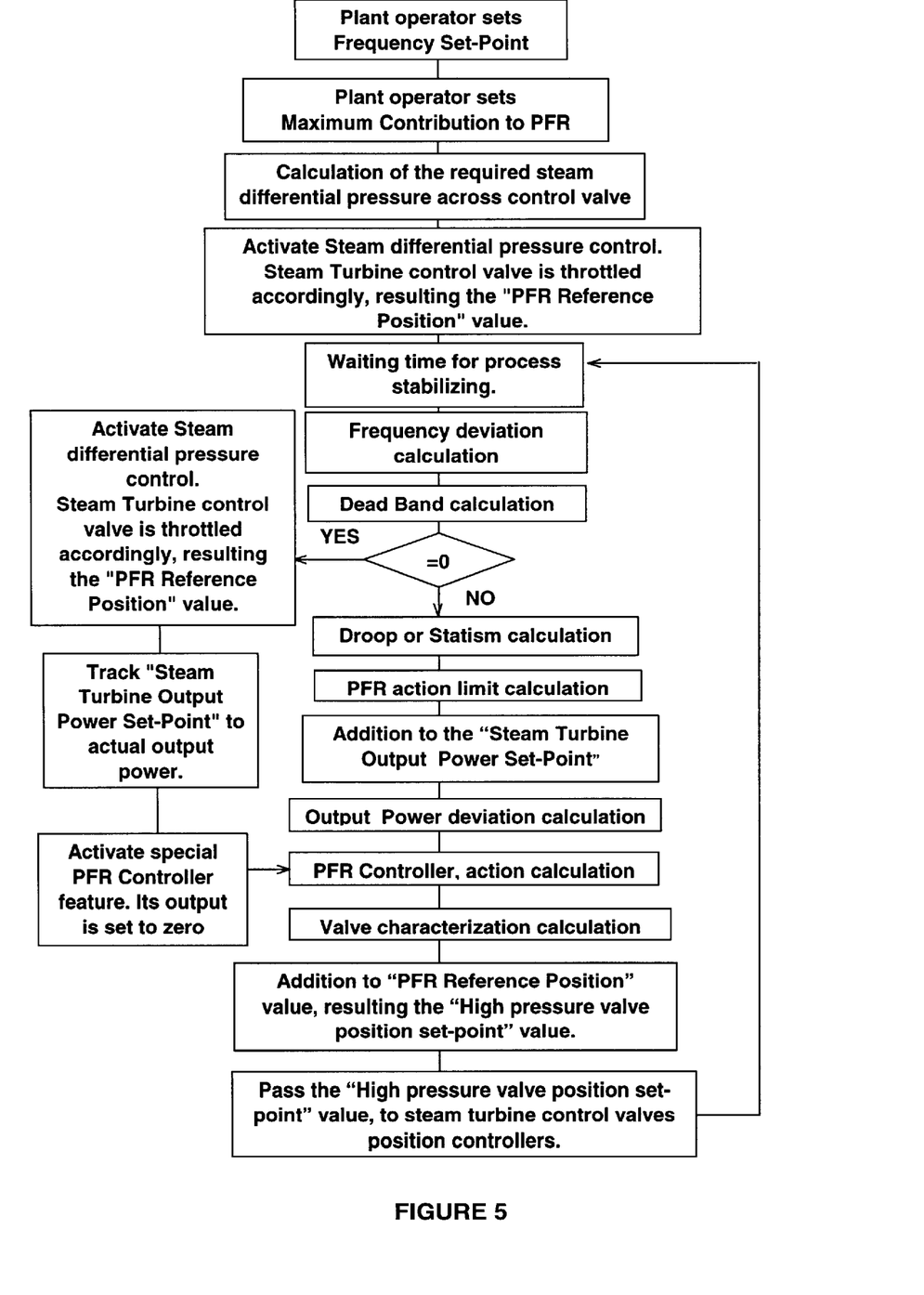
FIG. 5 is a flowchart showing the steps of the method of the present invention.

FIG. 4 illustrates a general block diagram of the method, and FIG. 5 is a flowchart showing the steps of the method.

The plant operator must in the first place fix the value of two parameters according to the requirements. One of these parameters is "Frequency Set Point." Frequency Set Point is the desired value for frequency, which normally is set as the rated frequency of the system. The second parameter that the operator must determine is "Maximum Contribution to PFR". Maximum Contribution to PFR is the absolute value of the maximum output power that PFR will contribute to control the mains frequency. This second value is determined by the operator on the basis of the local regulatory requirements for PFR in the system.

Once the "Maximum Contribution to PFR" value has been set, the block "Reference Position for PFR" calculates the degree of throttling of the control valves that is necessary to obtain such an increase in output power, whenever needed. In order to determine the throttling degree needed for the control valves, the block "PFR Reference Position" uses a table previously prepared on the basis of the results of control valve throttling tests as described hereinbefore. The table contains the values of the pressure differential across the turbine control valves and the corresponding output power increments. The block also controls the initial throttling degree of the steam turbine control valves, by emitting command signals to the position controller of the control valves (which are present in any turbine), until the desired pressure differential in the steam turbine control valves is obtained. The desired throttling degree in the control valves is then achieved. The block "PFR Reference Position" is activated again under certain circumstances, which are described below for the sake of clarity.

Once the control valves reached their reference position, and after a stabilizing time has elapsed, the Frequency Set Point is compared with the current frequency value, and the difference between them is calculated. This mathematical operation is represented by Block S1 in FIG. 3. The result of the subtraction operation indicates the deviation of the current frequency in relation to the desired frequency. The magnitude of the frequency deviation is fed into the "Dead Band" block. This block determines whether the frequency deviation exceeds a predetermined value, which is typically set forth by the local regulatory requirements of PFR for the system. If the frequency deviation exceeds the predetermined dead band value, the output value of the Dead Band block will be equal to the input value. Contrarily, if the frequency deviation does not exceed the dead band value, the output value from the Dead Band block will be equal to zero.

The output value of the Dead Band block is fed into the "Statism" block. The "Statism" block calculates the change in output power that must be imparted to the steam turbine. This calculation is a simple linear relationship. This linear relationship is typically established by the regulations on PFR for the local system. The linear relationship between frequency deviation and the corresponding change in required output power is known in the art as "Statism". Therefore, the "Statism" block outputs the value and sign of the required change in output power. According to the working principle of PFR, when the actual frequency is below the rated frequency, generators must produce extra output power; therefore the sign of the output signal from the "Statism" block is positive. On the other hand, when the actual frequency is above the rated frequency, generators must reduce their output power; therefore the sign of the output signal from the "Statism" block is negative.

The output signal from the "Statism" block is fed into the "PFR Action Limit" block. This block must determine whether the output signal from the "Statism" block, in absolute value, exceeds the value established by the "Maximum Contribution to PFR" operator. If the absolute value of the output of the "Statism" block does not exceed the value "Maximum contribution to PFR", then the output signal of the "PFR Action Limit" block will have the same value as its input. If the absolute value of the output of the "Statism" block exceeds the value "Maximum Contribution to PFR", then the output signal of the "PFR Action Limit" block will have the same value as "Maximum Contribution to PFR". The value of the output from the "PFR Action Limit" block will represent the change in output power that the steam turbine will undergo for the current frequency deviation.

The resulting value from "PFR Action Limit" is added to a "Steam Turbine Output Power Set Point". The value of the "Steam Turbine Output Power Set Point" results from a calculation made by the "Power SP Automatic Updating" block, which represents the value of the steam turbine output power for zero frequency deviation. The operation of the Power SP Automatic Updating" block is another innovation of the present method. Its function is explained below. The addition of the "PFR Action Limit" block and the "Steam Turbine Output Power Set Point" block is represented by block S2 in FIG. 4.

The resulting value from block S2 is then compared against the present value of the steam turbine output power, and the difference between both values is calculated. This subtraction operation in represented by block S3. The value resulting from such subtraction represents the steam turbine output power deviation from the desired value. This output power deviation is fed into a "PFR Controller" block, which basically consists of a controller known in the art as a closed loop controller with proportional plus integral action mode. Due to its operation principle, the controller will try to correct the output power deviation by calculating a correcting control output. Besides its proportional plus integral action mode, the "PFR Controller" incorporates a special structure, which constitutes another innovation of the present method. The special structure included in the "PFR Controller" is described below.

The correction value calculated by the "PFR Controller" is fed to a "Valve Characterization" block. Using the value of the correcting signal, which measures the deviation in output power, in this block the value of the valve position needed is calculated. The calculation simply consists of one input (the output power value) and one output (the aperture value of the control valves). This table is prepared from control data of the control valves, as given by their manufacturer.

The value resulting from the "Valve Characterization" block is added to the value previously calculated by the "PFR Reference Position". Such an addition is represented by block S4 in FIG. 4. The value resulting from the addition is termed the "High Pressure Valve Position Set Point". This value represents the desired aperture of the turbine control valves in order to supply PFR. This value is then transferred as a position set point value to the position controller of the control valves existing in any steam turbine. The controller must then take the valves to such position.

Finally, the "Frequency Set Point" is compared again with the current value of the frequency, and the difference between both values is calculated by the subtraction block represented by S1 in FIG. 4. Consequently, the process described above starts all over again.

The method of the invention makes use of the algorithms existing in the prior art to provide PFR in a generic turbine. However, the present method introduces several novel steps that provide PFR in a steam turbine at a combined cycle power generation plant.

The novel steps introduced by the present method are, namely, the "Power SP Automatic Updating" block and the "PFR Reference Position" block. Regarding the "PFR Controller" block, although its function is already known in the art, a new structure is incorporated that is essential for the proper operation of the present method. The above referenced blocks and their operation principles actually allow the execution of PFR in a combined cycle steam turbine in a way both efficient from the standpoint of the mains frequency control and from the standpoint of the plant operation. On the other hand, the use of the novel method allows for the continuous operation of the turbine in PFR mode, ensuring the stability of the steam process, and doing so without introducing any risk of emergency shutdowns due to the tripping of system protections.

The "PFR Reference Position" block contains the basic principle of the present method, which consists of the storage of energy. Besides producing the initial throttling of the control valves, this block is activated again when the output from the "Dead Band" block is equal to zero, that is to say when the mains frequency regulation does not need any action to be taken. In these cases the "PFR Reference Position" block checks that the current pressure differential across the steam turbine control valves is appropriate for the "Maximum Contribution to PFR" value established by the plant operator. In case any difference arises, the "PFR Reference Position" block corrects it by appropriately changing the output of its block. By controlling the steam pressure differential across the steam turbine control valves, the "PFR Reference Position" block guarantees that enough stored energy is available at any time to take care of sudden changes in required output power. On the other hand, the "PFR Reference Position" block contributes to the task of ensuring that the steam turbine output power will not be limited because of excessive valve throttling.

To avoid limitations in the steam turbine output power, or that an amount of output power is required from the turbine that it cannot deliver, the "Power SP Automatic Updating" block and the special structure built into the "PFR Controller" block are used to provide an appropriate "Steam Turbine Power Set Point" at any time. In other turbine types different from combined cycle steam turbines, the Power Set Point is a fixed value chosen at will by the plant operator.

The above-mentioned special structures of the present method have been designed to address the problems of combined cycle plants, where it is impossible to predict accurately the amount of output power available to the steam turbine, and also taking into account the potential instability derived from a wrong selection of the Power Set Point. The "Power SP Automatic Updating" operates as follows: when the output signal from the "Dead Band" block is equal to zero, the "Steam Turbine Power Set Point" block is caused to acquire the current value of the steam turbine output power. At the same time, the special structure built into the "PFR Controller" is activated, causing the output of the proportional plus integral controller, and, correspondingly, the output from the "PFR Controller", are equal to zero. Therefore, the "High Pressure Valve Position Set Point" takes the value of the output from the "PFR Reference Position" block, then the steam turbine control valves will acquire such position. Using this structure, when the output from the "Dead Band" block is equal to zero, the present method ceases to conduct an output power control on the steam turbine, allowing it to reach its natural value, and causing the "Steam Turbine Power Set Point" block to adopt such power value on a continuous basis, then ensuring an appropriate value for the "Steam Turbine Power Set Point" at any time.

What is claimed is:

1. A method for providing Primary Frequency Regulation (PFR) in a steam turbine of a combined-cycle power generation plant, said plant comprising at least one gas turbine and at least one said steam turbine, said steam turbine further comprising at least one control valve, wherein said method comprises the steps of:

setting a frequency setpoint and a maximum contribution value to primary frequency control action;

calculating the steam differential pressure across the control valve required to increase output power by the maximum contribution value within a predetermined time interval and to maintain the increased power over time;

activating a differential pressure controller across the control valve to obtain the calculated differential pressure, whereby the control valve reaches a PFR reference position;

allowing the output power to stabilize;

comparing the frequency setpoint with an actual grid frequency to obtain a frequency deviation value;

applying a predetermined dead band to the frequency deviation value to obtain an adjusted frequency deviation;

calculating a required steam turbine output power variation as a function of the adjusted frequency deviation;

applying limits to the required steam turbine output power variation by comparing it with the maximum contribution value;

adding the limited calculated output power variation to a calculated steam turbine output power set point to obtain a modified power output set point;

comparing the modified power output set point with actual steam turbine output power to obtain a steam turbine output power deviation;

applying a proportional-plus-integral control function to the steam turbine output power deviation to calculate a correcting control output signal;

passing the correcting control output signal to a valve characterization table to obtain a valve position value;

adding the valve position value to the PFR Reference Position; and setting a valve position set point of the control valve as the sum of the valve position value and the PFR reference position.

2. The method of claim 1, wherein the required steam differential pressure across the control valve is calculated through a table, wherein the values in the table are empirically determined.

3. The method of claim 1, further comprising the step of reactivating the differential pressure control across the control valve when the adjusted frequency deviation is equal to zero.

4. The method of claim 1, further comprising the step of setting the steam turbine output power set point to the current value of the steam turbine output power when the adjusted frequency deviation is equal to zero.

5. The method of claim 1, wherein when the adjusted frequency deviation is equal to zero the correcting control output is set to zero, whereby the control valve is opened to the PFR Reference Position.

* * * * *